(12) United States Patent
Howard et al.

(10) Patent No.: US 8,325,761 B2
(45) Date of Patent: Dec. 4, 2012

(54) SYSTEM AND METHOD FOR ESTABLISHING SUFFICIENT VIRTUAL CHANNEL PERFORMANCE IN A PARALLEL COMPUTING NETWORK

(75) Inventors: Kevin D. Howard, Tempe, AZ (US); Glen C. Rea, Longmont, CO (US)

(73) Assignee: Massivley Parallel Technologies, Inc., Boulder, CO (US)

( * ) Notice: Subject to any disclaimer, the term of this patent is extended or adjusted under 35 U.S.C. 154(b) by 422 days.

(21) Appl. No.: 12/749,915

(22) Filed: Mar. 30, 2010

(65) Prior Publication Data
US 2010/0183028 A1 Jul. 22, 2010

Related U.S. Application Data

(60) Continuation-in-part of application No. 12/197,881, filed on Aug. 25, 2008, now Pat. No. 7,730,121, which is a division of application No. 10/340,524, filed on Jan. 10, 2003, now Pat. No. 7,418,470, which is a continuation-in-part of application No. 09/603,020, filed on Jun. 26, 2000, now Pat. No. 6,857,004.

(60) Provisional application No. 60/347,325, filed on Jan. 10, 2002, provisional application No. 61/165,301, filed on Mar. 31, 2009, provisional application No. 61/166,630, filed on Apr. 3, 2009.

(51) Int. Cl.
*H04J 3/16* (2006.01)
(52) U.S. Cl. ...................................... 370/468
(58) Field of Classification Search ................ None
See application file for complete search history.

(56) References Cited

U.S. PATENT DOCUMENTS

| 5,166,674 A | 11/1992 | Baum et al. |
| 5,224,100 A | 6/1993 | Lee et al. |
| 5,325,526 A | 6/1994 | Cameron et al. |
| 5,349,682 A | 9/1994 | Rosenberry |
| 5,371,852 A | 12/1994 | Attanasio et al. |
| 5,488,609 A | 1/1996 | Hluchyj et al. |
| 5,689,722 A | 11/1997 | Swarztrauber |
| 5,699,500 A | 12/1997 | Dasgupta |

(Continued)

FOREIGN PATENT DOCUMENTS
EP 0107453 5/1984
(Continued)

OTHER PUBLICATIONS

Thibodeaux, "Organizers Hope to Give Lafayatte Superstart in High-Tech Direction", 10/27, Supercomputeronline.com, 2 pages.

(Continued)

*Primary Examiner* — Chirag Shah
*Assistant Examiner* — Amar Persaud
(74) *Attorney, Agent, or Firm* — Lathrop & Gage LLP

(57) ABSTRACT

A method for interconnecting multiple computational devices in a parallel computing network including a plurality of serially associated pairs of nodes, wherein each of the pairs of nodes is interconnected via at least one physical communication channel. A sufficient virtual channel rate required to provide a predetermined amount of Amdahl scaling is first determined. The maximum number of virtual channels, each having a transmission rate at least equal to the sufficient virtual channel rate, that can be implemented over each physical communication channel is then determined. The physical communication channel between each of the nodes is then subdivided into the determined maximum number of virtual channels.

15 Claims, 7 Drawing Sheets

U.S. PATENT DOCUMENTS

| | | | |
|---|---|---|---|
| 5,758,144 | A | 5/1998 | Eberhard et al. |
| 5,838,906 | A | 11/1998 | Doyle et al. |
| 5,857,076 | A | 1/1999 | Schmidt |
| 5,860,010 | A | 1/1999 | Attal |
| 5,905,736 | A | 5/1999 | Ronen et al. |
| 6,014,669 | A | 1/2000 | Slaughter et al. |
| 6,117,180 | A | 9/2000 | Dave et al. |
| 6,145,765 | A | 11/2000 | Hart |
| 6,163,855 | A | 12/2000 | Shrivastava et al. |
| 6,167,428 | A | 12/2000 | Ellis |
| 6,295,573 | B1 | 9/2001 | Bailey et al. |
| 7,130,270 | B2 * | 10/2006 | Alferness et al. ............ 370/235 |
| 7,177,971 | B2 * | 2/2007 | Ajanovic et al. ............ 710/311 |
| 7,324,553 | B1 * | 1/2008 | Varier et al. ................. 370/468 |
| 7,535,853 | B2 * | 5/2009 | Briscoe et al. ............... 370/252 |
| 7,941,479 | B2 * | 5/2011 | Howard et al. ............... 709/201 |
| 8,045,974 | B2 * | 10/2011 | Danzeisen et al. ........... 455/424 |
| 2001/0011294 | A1 | 8/2001 | Ellis |
| 2003/0135614 | A1 | 7/2003 | Hattori et al. |

FOREIGN PATENT DOCUMENTS

| | | |
|---|---|---|
| EP | 0640930 | 5/1995 |
| EP | 0921485 | 6/1999 |
| EP | 1031923 | 8/2000 |
| EP | 1096378 | 5/2001 |
| WO | 9427216 | 11/1994 |
| WO | 9919807 | 4/1999 |
| WO | 0101219 | 1/2001 |

OTHER PUBLICATIONS

IBM, "Cluster-Based Stack Optimization Algorithm for Very Large-scale Integration", Sep. 1987, IBM Technical disclosure Bulletin, vol. 30, Issue 4, p. No. 1445-1447 (4).

Chong et al, "Concurrent Processing for Picture Archiving and Comunication system (PACS)", Jun. 1995, IEEE, p. No. 468-472.

Antaki et al, "The soft side of New Enterprise", May 1999, MIT enterprise FORUM of Dallus Network Inc., 2 pages.

Hitachi, "The Next Generation of Information Technology", spring 97, Hitachi today No. 39, p. No. 1-6 and cover page.

Kahaner, "Fujitsu's 2.sup.nd Parallel computing WS (PCW'93) Nov. 1993 Kawasaki Japan" Dec. 1993, 15 pages.

Ryan et al, "A Scalable Distributed Multimedia Knowledge Retrieval System on a cluster of Heterogeneous High Performance Architectures", International Journal on artificial intelligence tools, vol. 9, No. 3 (2000) p. No. 343-367.

(Author unknown), "CAD comes on line", Feb. 21, 2000, p. s-28, Design News-Automotive.

Danny Hills, "Massive, Parallel Supercomputers—Where they're Going—How They'll Work", Forbes ASAP, Feb. 22, 1999, pp. 60-62 and 64.

Internet Information article: "MSC.SOFTWARE Announces visualNastran 4d2Go; A total Engineering Solution to be Bundled with CAD Products", Mar. 6, 2000.

Cohen, ED et al. Efficient Covexity and Domination Algorithms for Fine- and Medium-Grain Hybercube Computers, Algoithmica, vol. 7, pp. 51-75, Springer Vertag New York, Inc., 1992.

Benedicts, E.P., "Multiprocessor architectures are converging", Hypercube Concurrent Computers and Applications: Proceedings of the third conference on Hypercube concurrent computers and applications: Architecture, software, computer systems, and general issues, vol. 1, pp. 12-20, Pasadena, California, Jan. 19-20, 1988.

Livingston, Marilyn L. and Stout, Quentin F., "Fault Tolerance of the Cyclic Buddy Subcube Location Sceme in Hypercubes", Proceedings of the 6th Distributed Memory Computing Conference (1991), IEEE, pp. 34-41, 1991.

Fox, G.C., "What have we learnt from using real parallel machines on real problems?", Hypercube Concurrent Computers and Applications: Proceedings of the third conference on Hypercube concurrent computers and applications: Architecture, software, computer systems, and general issues, vol. 2, pp. 897-955, Pasadena, California, Jan. 19-20, 1988.

"Topologies—computational messaging for multicomputers", Hypercube Concurrent Computers and Applications: Proceedings of the third conference on Hypercube concurrent computers and applications: Architecture, software, computer systems, and general issues, vol. 1, pp. 580-593, Pasadena, California, Jan. 19-20, 1988.

Keagle, C., et al.: "Categorization and performance analysis of advanced avionics algorithms on parallel processing architectures" IEE, May 22, 1989, pp. 1722-1724.

Trystram D: "Scheduling parallel applications using malleable tasks on clusters" Parallel and Distributed Processing Syposium., Proceedings 15th International San Francisco, CA, USA Apr. 23-27, 2001, Los Alamitos, CA USA, IEE Comput. Soc, 2128-2135.

Min-Bin Chen, et al.: "Parallel 2d delaunay triangulations in hpf and mpi" Parallel and Distributed Processing Symposium, Proceeding 15th International San Francisco, CA, USA Apr. 23-27, 2001, Los Alamitos, CA, USA, IEEE Comput. Soc, 301-308.

Fernandez, E.B., et al: "Fault-tolerant parallel algorithms" Proceedings of Southeaston. Williamsburg, Apr. 7-10, 1991, Proceedings of the Southeast Conference, New York, IEEE, US vol. 1, pp. 466-469.

Xiaoxiong, Zhong, et al.: "Optimal implantation of parallel divide-and-conquer algoorths on de Bruijn networks" Frontiers of assively Parallel Computatioh, 1992., Fourth Symposium on the McLean, VA, USA Oct. 19-21, 1992, Los Alamitos, CA, USA, IEEE Comput. Soc, US, pp. 583-585.

Welch, L.R., et al.: "Metrics and techniques for automatic partitioning and assignment of object-based concurrent programs" Parallel and Distributed Processing, 1995. Proceedings. Seventh IEEE Symposium on San Antonio, TX, USA Oct. 25-28, 1995, Los Alamitos,CA, USA, IEEE Comput. Soc, US, pp. 440-447.

Kwan, A.W., et al.: "Using parallel programming paradigms for structuing programs on distributed memory computers" IEE, Apr. 28, 1991, pp. 210-213.

Grundy, J: "Software architecture modelling, analysis an dimplementation with softarch" Proc 34th Hawaii International Conference on System Sciences, Jan. 3, 2001, pp. 3825-3834.

Pontelli, E., et al: "Automatic compile-time parallelization of prolog programs for dependent and-parallelism" Proc. of the Fourteenth International Conference on Logic Programming, [online] Jul. 1997, pp. 108-122, Retrieved From the Internet URL:http://citeseer.ist.psu.edu/cacxhe/papers/cs/16510/http:zSzzSzwww.cs.nmsu.eduzSzguptazSzacezSzstaticdap.pdf/pontelli97automatic.pdf> [retrieved Sep. 1, 2004].

Coddington, P.D., et al: "Web-based access to distributed high-performance geographic information systems for decision support" Proceedings of the Hawaii International Conference on System Sciences, XX, XX, Jan. 5, 1999, pp. 1-12.

"Method Sending Object Agent and Receiving Object Agent" IBM Technical Disclosure Bulletin, IBM Corp. New York, US, vol. 39, No. 12, Dec. 1, 1996, p. 43.

Cameron, I, et al.: "BT Webworld TM-WEB Hosting for Every business Need" British Telecommunications Engineering, British Telecommunications Engineering, London, GB, vol. 16, No. 4, 1998, pp. 273-278.

Saletore, V.A., et al.: "Parallel Computations on the CHARM Heterogeneous Workstation Cluster" High Performance Distributed Computing, 1994, Proceedings of the Third IEEE International symposium on San Francisco, CA, USA Aug. 2-5, 1994, Los Alamitos, CA, USA, IEEE Comput. Soc, Aug. 2, 1994, pp. 203-210.

Desouza-Batista, J.C., et al.: "A Sub-optimal 28 Assignment of Application Tasks Onto Heterogeneous Systems" Heterogeneous Computing Workshop, 1994, Proceedings Cancun, Mexico Apr. 26, 1994, Los Alamitos, CA USA, IEEE Comput Soc., 1994, pp. 9-16.

Ross, G.B. et al.: "A Scalable Mutlicomputer" Circuits and Systems, 1993, Proceedings of the 36th Midwest Symposium on Detroit, MI, USA Aug. 16-18, 1993, New York, NY, USA, IEEE, Aug. 16, 1993, pp. 1117-1120.

Chowdhury, A., et al.: "Supporting Dynamic Space-Sharing on Clusters of Non-Dedicated Workstations" Distributed Computing Systems, 1997, Proceedings of the 17th International Conference in Baltimore, MD, USA May 27-30, 1997, Los Alamitos, CA, USA, IEEE Comput. Soc, US May 27, 1997, pp. 149-158.

Selected File History from related U.S. Appl. No. 09/603,020; 100 pages; dated Sep. 16, 2003 through Oct. 14, 2004.

Selected File History from related U.S. Appl. No. 10/340,524; 44 pages; dated Aug. 6, 2007 through Apr. 18, 2008.

Selected File History from related U.S. Appl. No. 12/197,881; 22 pages; dated Sep. 9, 2009 through Jan. 28, 2010.
Selected File History from related European Patent Application No. 00944888.7, 41 pages, dated Jul. 1, 2004 through Sep. 22, 2006.
Selected File History from related European Patent Application No. 03713226.3, 45 pages, dated Apr. 19, 2007 through Feb. 15, 2010.

International Search Report from related PCT Patent Application No. PCT/US00/17576, 6 pages, Nov. 14, 2000.
International Search Report from related PCT Patent Application No. PCT/US03/000787, 8 pages, Sep. 2, 2004.

* cited by examiner

SYSTEM AND METHOD FOR ESTABLISHING SUFFICIENT VIRTUAL CHANNEL PERFORMANCE IN A PARALLEL COMPUTING NETWORK

RELATED APPLICATIONS

The present application claims priority to U.S. Provisional Application Ser. No. 61/165,301 filed Mar. 31, 2009, and U.S. Provisional Application Ser. No. 61/166,630, filed Apr. 3, 2009, contents of both of which are hereby incorporated by reference, including their appendices.

This application is also a continuation-in-part of U.S. patent application Ser. No. 12/197,881, filed Aug. 25, 2008, now U.S. Pat. No. 7,730,121, which is a divisional application of U.S. patent application Ser. No. 10/340,524, filed Jan. 10, 2003 (now U.S. Pat. No. 7,418,470), which claims priority to U.S. Patent Application 60/347,325, filed Jan. 10, 2002 and is a continuation-in-part of U.S. patent application Ser. No. 09/603,020, filed on Jun. 26, 2000 (now U.S. Pat. No. 6,857,004), all of which are incorporated herein by reference.

BACKGROUND

As first shown by Dr. Gene Amdahl in his 1967 paper "Validity of the Single Processor Approach to Achieving Large-Scale Computing Capabilities" connecting together multiple parallel processing computational devices has long been a problem for the High Performance Computer community. To solve this problem the industry has introduced faster and faster communication channels and connection models. However, communication speed, otherwise known as bandwidth, represents only part of the communication/system-scaling problem. In parallel processing there are five components: the processing time for the algorithmically relevant portions of some computer program, the processing time for non-algorithmically relevant portions of some computer program (computational overhead), data transmission bandwidth, the transmission of non-required/redundant data, and data transmission latency. If there is no non-required/redundant data transmitted, the total processing time (algorithmically relevant and irrelevant processing time) and bandwidth are fixed then the overhead of data transmission latency time still remains.

SUMMARY

The presently described method of 'sufficient channel performance' directly addresses latency issues and provides improved efficiency in parallel processing networks. A system and method is described for interconnecting multiple computational devices in a parallel computing network including a plurality of serially associated pairs of nodes, wherein each of the pairs of nodes is interconnected via at least one physical communication channel. A 'sufficient virtual channel rate' required to provide a predetermined amount of Amdahl scaling is first determined. The maximum number of virtual channels, each having a transmission rate at least equal to the sufficient virtual channel rate, that can be implemented over each physical communication channel is then determined. The physical communication channel between each of the nodes is then subdivided into the determined maximum number of virtual channels.

DETAILED DESCRIPTION

Sufficient Communication Channel Rate

Figure 1A:
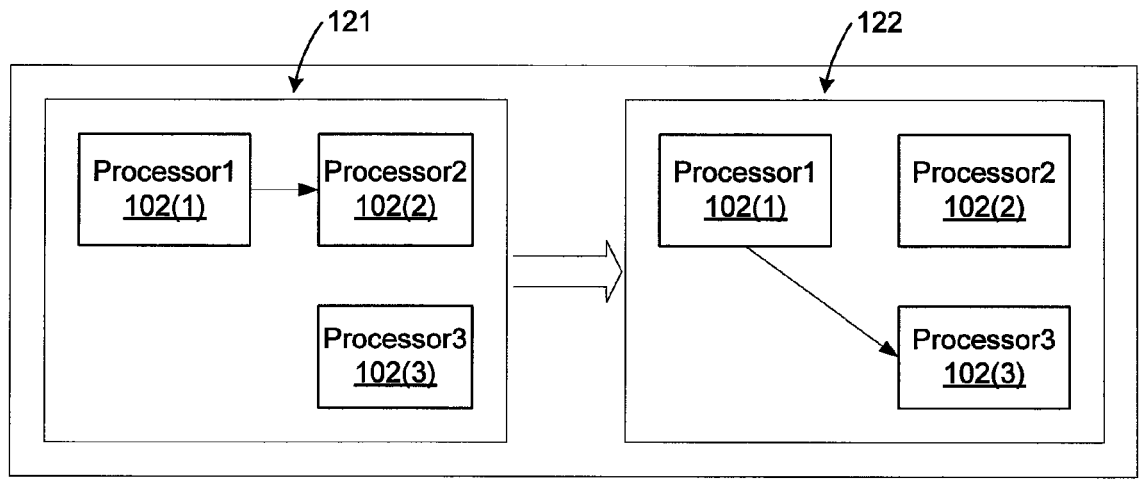
FIGS. 1A and 1B are diagrams showing two examples of channel use in the prior art.

Given a pair of computational elements working on the same problem in parallel such that they must communicate some data to one another before they can complete their respective portion of the problem, if that pair is connected via a communication channel and if the required Amdahl scaling between that pair is some selected multiplier of the average pair performance, then a sufficient communication channel rate accomplishes this scaling.

This 'sufficient channel performance' concept dictates that rather than continuously increasing channel speed (as is the normal case in the industry) there needs only to be sufficient channel performance to provide Amdahl scaling between pair-wise connected nodes. Thus, rather than looking at Amdahl's law as indicating serial versus parallel performance, it is employed in the present method/system to determine a pair-wise performance. This is the inverse of how things are presently done in the industry.

Since the present method is concerned with virtual, as opposed to physical, communication channels, the virtual channel performance can be manipulated such that it provides only enough performance for a particular need. Therefore, the rest of the physical channel capacity can be used to generate other virtual channels that may be used by other algorithms. Data transmission performance is thus considered sufficient if a particular required Amdahl multiplier value S is met for the linked computational elements over some parallel algorithm X.

Amdahl's law: $S_p(X) = ((1-f) + f p^{-1})^{-1}$

Where f=Percent of the time spent acting in parallel,
p=number of computational elements, and
$S_p(X)$=Multiplier effect for 'p' computational elements over algorithm X.

If a 1.9 Amdahl speedup for a pair of computational elements is required, then:

$S_2(X) \geq 1.90 \Rightarrow f \approx 0.95$

Thus, the maximum amount of time allowed for all serial operations, including exposed data transmission time and latency, is given by:

$f_s = 1 - f = 0.05$ or 5%

If "f" represents the acceptable parallel activity of a sufficiently performing computational pair then "(1−f)/n" represents the acceptable serial activity of "n" serialized, sufficiently performing computational pairs of nodes. This changes the example to the following:

If a 1.9 Amdahl speedup for three (working in pairs) serialized computational elements is required then:

$$S_3(X) \geq 1.90 \Rightarrow f \cong 0.975$$

Thus, $f_s = 0.025$ or 2.5%, which means that the Amdahl scaling is maintained even with an efficiency of only 97.5% when the industry might require a much more difficult to obtain (and thus more expensive) 99% efficiency to obtain the same results.

The method of the present concept means that only the maximum number of serially associated pairs of nodes (within a data exchange) need be calculated and the channel speed sufficiency over just those pairs ensures that the exchange will scale, regardless of how many other nodes are part of the exchange. For the purpose of the present description, a node may be any computational device, such as a server, a processor, a processor core, or a cluster of servers.

The binary tree (or if only one channel is used, the Howard Cascade) sequence, 1, 3, 7, 15 may be used as an example. A (Type I) Howard Cascade computational element count given the communication channel count per computation element is shown below:

$$P_\phi = \psi((\nu+1)^\phi - 1)\nu^{-1}; iff \phi \geq 0$$

$$P_\phi 0; iff \phi < 0$$

Where:

$\psi \equiv$ # of communication channels at the generate computational element $\nu \equiv$ # of communication channels at the tree computational element $\phi \equiv$ # of time steps Rather than applying Amdahl's law to 15 nodes (as the law states and as it is used currently) the present method applies it to only 3 serialized pairs of nodes (or 2 pairs for 7 nodes, or 1 pair for 3 nodes). Also, rather than calculating the scaling provided, the virtual channel performance required for the pairs to scale is calculated. Since the pairs represent the only exposed serialism, this means that these pairs represent only the actual performance required. This is fundamentally important, as (a) it allows the system efficiency to be calculated prior to running a particular job (which is not presently possible with current technology), (b) it provides the minimum channel performance required to meet the scaling requirements, and (c) it provides a method for manipulating virtual channels that is scaling-centric versus capacity-centric.

The above 'sufficient communication channel rate' computation need be performed only for the single set of nodes that represents the 'long-pole' of (i.e., the longest computational path through) the computational pairs. For example, if 3×3 nodes are arranged in a square (as shown below in Table 1), with the inter-nodal communication occurring from top to bottom, then only the two pair-wise exchanges representing the 'long-pole' need be calculated.

TABLE 1

| 1 | 2 | 3 |
|---|---|---|
| 4 | 5 | 6 |
| 7 | 8 | 9 |

That is, if data is moved from 1 to 4 to 7 and from 2 to 6 to 8 and from 3 to 6 to 9, then, since each path is the same length in terms of communication number, only the channel performance of one of the groups, for example, 1 to 4 to 7, need be calculated. This will guarantee that the same scaling will occur for all three groups. This minimum calculation aspect greatly decreases the efficiency requirements of the present system/method over a raw use of Amdahl's law.

Virtual Channel Bonding

Channel bonding occurs when two or more physical communication channels are used to move the same dataset such that the data transmission time decreases as a function of the number of bonded channels. Inter-channel data skew (because of timing issues across physical devices) limits the effectiveness of physical channel bonding. Virtual channel bonding occurs when a single physical channel is subdivided into multiple discrete virtual channels with two or more of those virtual channels combined such that the data transmission time decreases as a function of the number of bonded channels. Unlike physical channel-bonding techniques, virtual channel bonding does not have data skew, as all communication takes place across the same physical device.

If the virtual channel performance is set to the lowest transmission rate acceptable on the physical channel, then faster performance is available on demand by bonding together multiple virtual channels until the desired transmission rate is reached. Since the present system requires that pair-wise connected nodes scale to some required level, using virtual channel bonding to dynamically change the channel performance to provide the required minimum transmission rate maximizes the number of virtual channels that can be used with any particular algorithm. Maximizing the number of virtual channels non-linearly maximizes the system scaling.

Sufficient Virtual Channels

Since communication channels can be constructed using different transmission frequencies, pulse widths, and phase angles, multiple communication channels can travel using the same physical interconnect, as is well known, such as, multi-rail and virtual channels. The physical channel can be decomposed (subdivided) into as many virtual channels as remain sufficient to scale at the pair-wise level, allowing an increase in the number of computational elements that are in communication while maintaining the scaling of the group of elements processing a single problem in parallel.

If a pair of computational devices running some shared algorithm have an Amdahl scaling factor S that is sufficient (as much as required) at some communication bandwidth X and some latency Y then increasing the bandwidth has no practical effect on that pair's scaling.

Figure 1B:
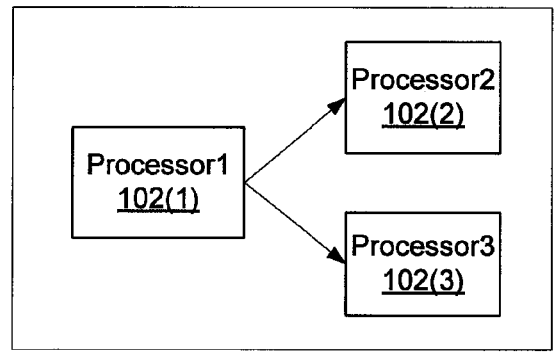

Therefore:

$X+Y=S$ and $aX+Y=S$; for all practical purposes; where $a$=some bandwidth multiplier FIG. 1A shows a segment of a prior art system having a channel bandwidth of 2× bits/sec, wherein Processor1 [102(1)] communicates with Processor2 [102(2)] in a first time step 121, and communicates with Processor3 [102(3)] in a second time step 122. FIG. 1B shows a segment of a prior art system having a channel bandwidth of X bits/sec, wherein Processor1 [102(1)] communicates with Processor2 [102(2)] and Processor3 [102(3)] in a single time step.

In the current practice, the processing in both FIGS. 1A and 1B is treated as equivalent when the channel bandwidth in FIG. 1A has twice the bandwidth as the channel bandwidth in FIG. 1B. However, this is untrue as the latency in FIG. 1A is twice that of FIG. 1B. Therefore, creating multiple virtual sufficient channels out of a particular physical channel bandwidth offers a latency advantage over using the full bandwidth of a single channel. This advantage remains even in the case where all of the physical channel bandwidth is not consumed.

Figure 2A:
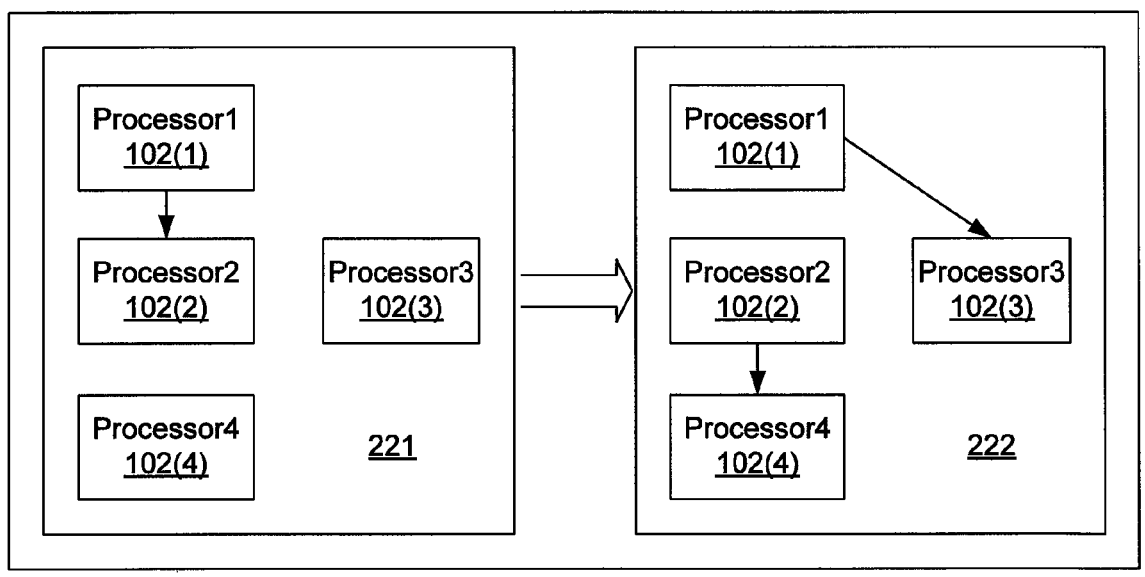
FIG. 2A is an exemplary diagram showing a Howard Cascade structure using a single virtual channel.
Figure 2B:
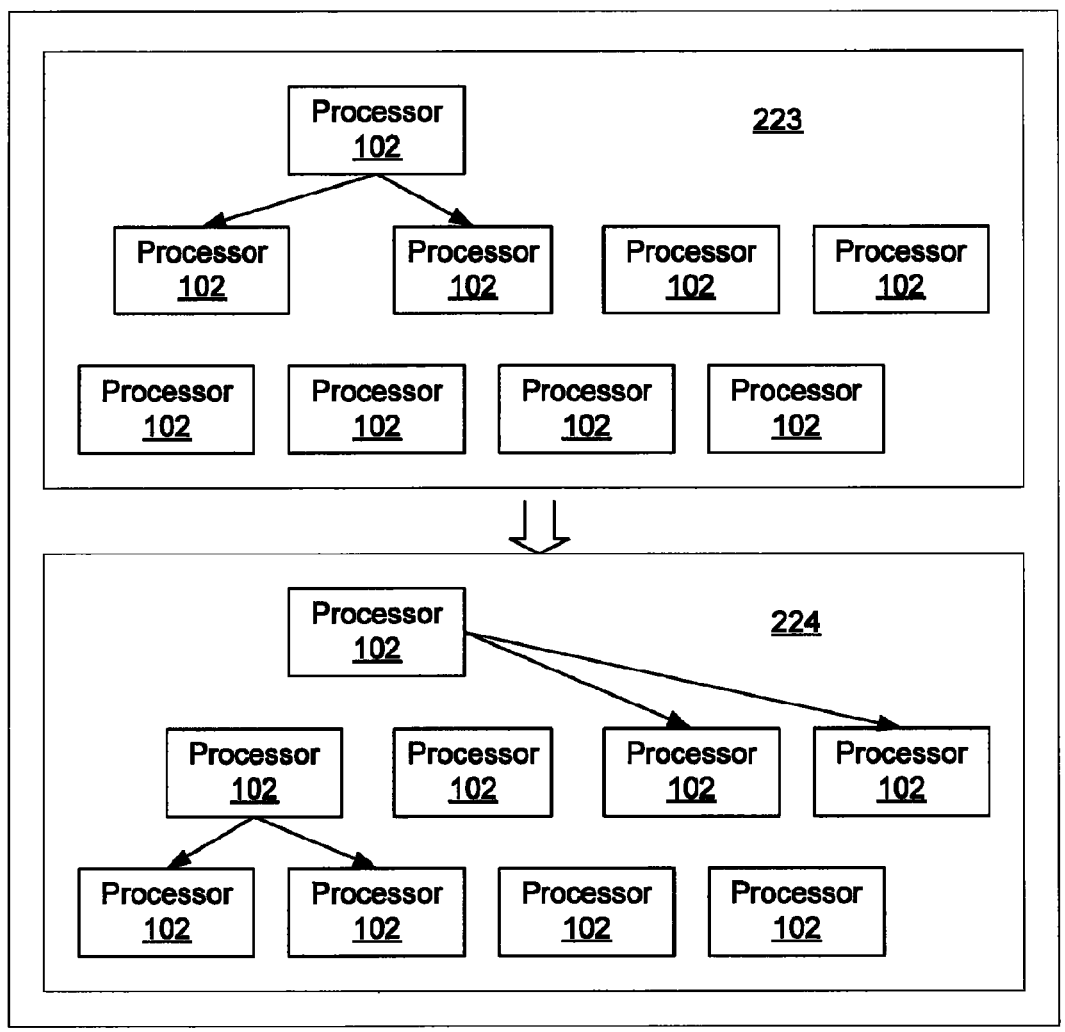
FIG. 2B is an exemplary diagram showing a Howard Cascade structure using dual virtual channels.

Using multiple virtual sufficient channels in either a Howard Cascade or other tree-like structure offers additional advantages, as can be observed from a comparison of FIGS. 2A and 2B, both of which employ an exemplary Howard Cascade structure. FIGS. 2A and 2B both show inter-processor communication taking place in two time steps 221/222, and 223/224, respectively. In FIG. 2A, only a single virtual channel is used, whereas in FIG. 2B, two virtual channels are employed. Even if the channel in FIG. 2A has twice the bandwidth of that in FIG. 2B, it may not be able to scale as well if the communication is latency bound. If latency is the deciding factor, then FIG. 2A will scale with 3 nodes in two time-steps versus the 8 nodes FIG. 2B would scale to.

Figure 3:
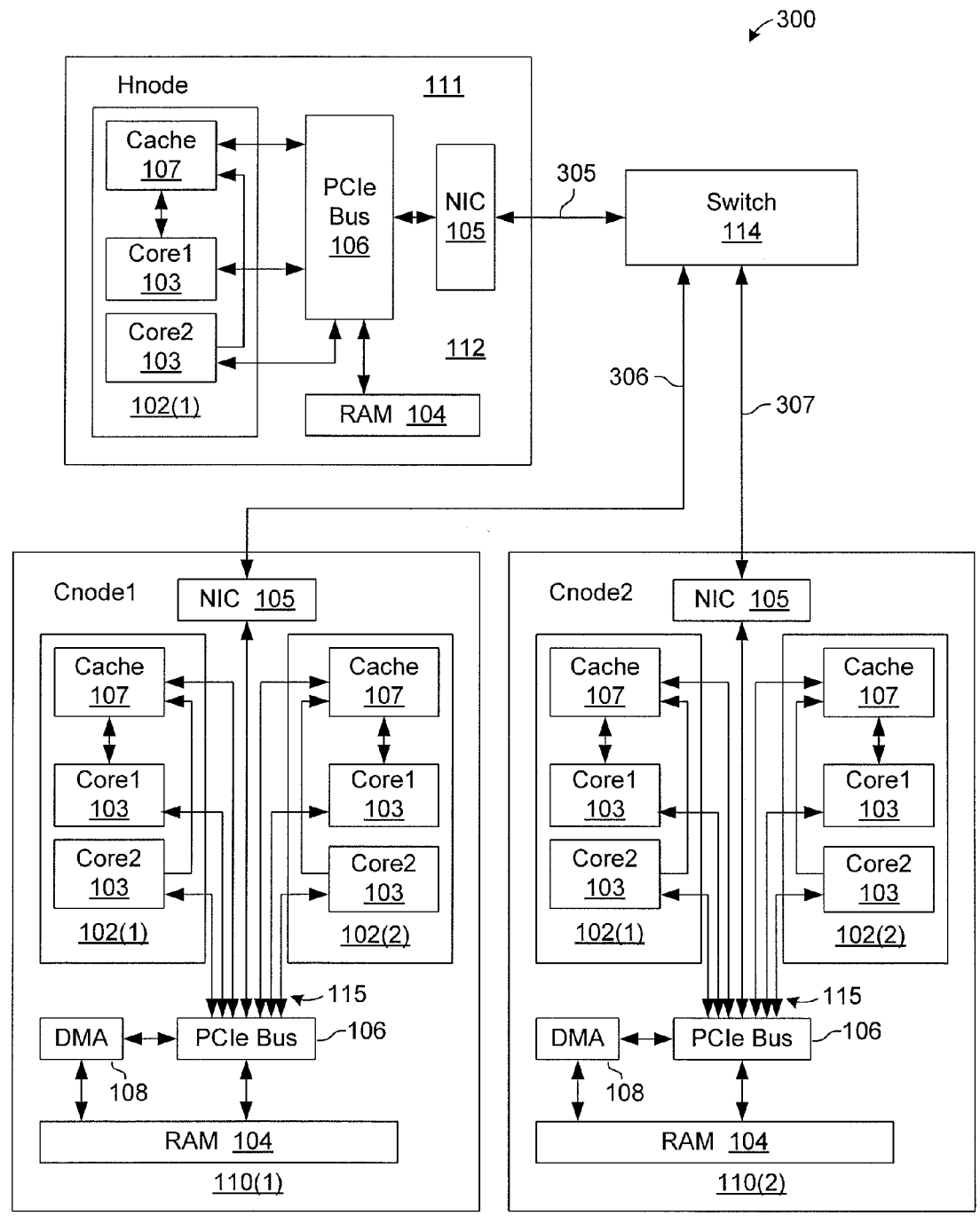
FIG. 3 is a diagram showing an exemplary parallel processing system.

Multi-server, Multi-processor, Multi-Core Sufficient Virtual Channel Type I Howard Cascade FIG. 3 is a diagram showing an exemplary parallel processing system 300 in a Howard Cascade structure with which the present method may be employed. As shown in FIG. 3, three servers are defined, an Hnode or home node (scheduling node) 111 and two Cnodes or computational nodes, Cnode1 [110(1)] and Cnode2 [110(2)]. In an exemplary embodiment, each Cnode 110 includes a dual-processor machine comprising processors 102(1) and 102(2), each of which have two cores 103 and cache memory 107. Each Cnode server 110 also includes a NIC (Network Interface Card) 105, a PCIe (Peripheral Component Interconnect Express) bus 106, DMA (Direct Memory Access) controller 108, and RAM (Random Access Memory) 104. Cnodes 110(1) and 110(2) are connected via physical cabling 306/307 to switch 114 which is connected via cabling 305 to Hnode 111.

Sufficient Channel Types

There are two possible types of sufficient channels—ones constructed using bandwidth limiting across a network and ones constructed using multiple PCIe bus lanes. Bandwidth limiting is typically used by network providers to manage oversubscribed network bandwidth. This means that multiple virtual communication channels can be created. If a virtual channel is created which connects a core in one server with a core in another server and if the performance of that virtual channel is such that the performance of the two cores is within some requested scaling factor, then that virtual channel shall be considered a sufficient virtual channel.

Multiple PCIe bus lanes 115 can also be accessed together to increase the bandwidth used to access RAM 104, DMA controller 108, or NIC 105. If the number of PCIe bus lanes used have an aggregate channel rate which equals or exceeds the performance of the sufficient virtual channel, then the group of PCIe bus lanes can be considered an extension of the sufficient virtual channel, or alternatively, can be considered to be a separate sufficient virtual channel.

Figure 4:
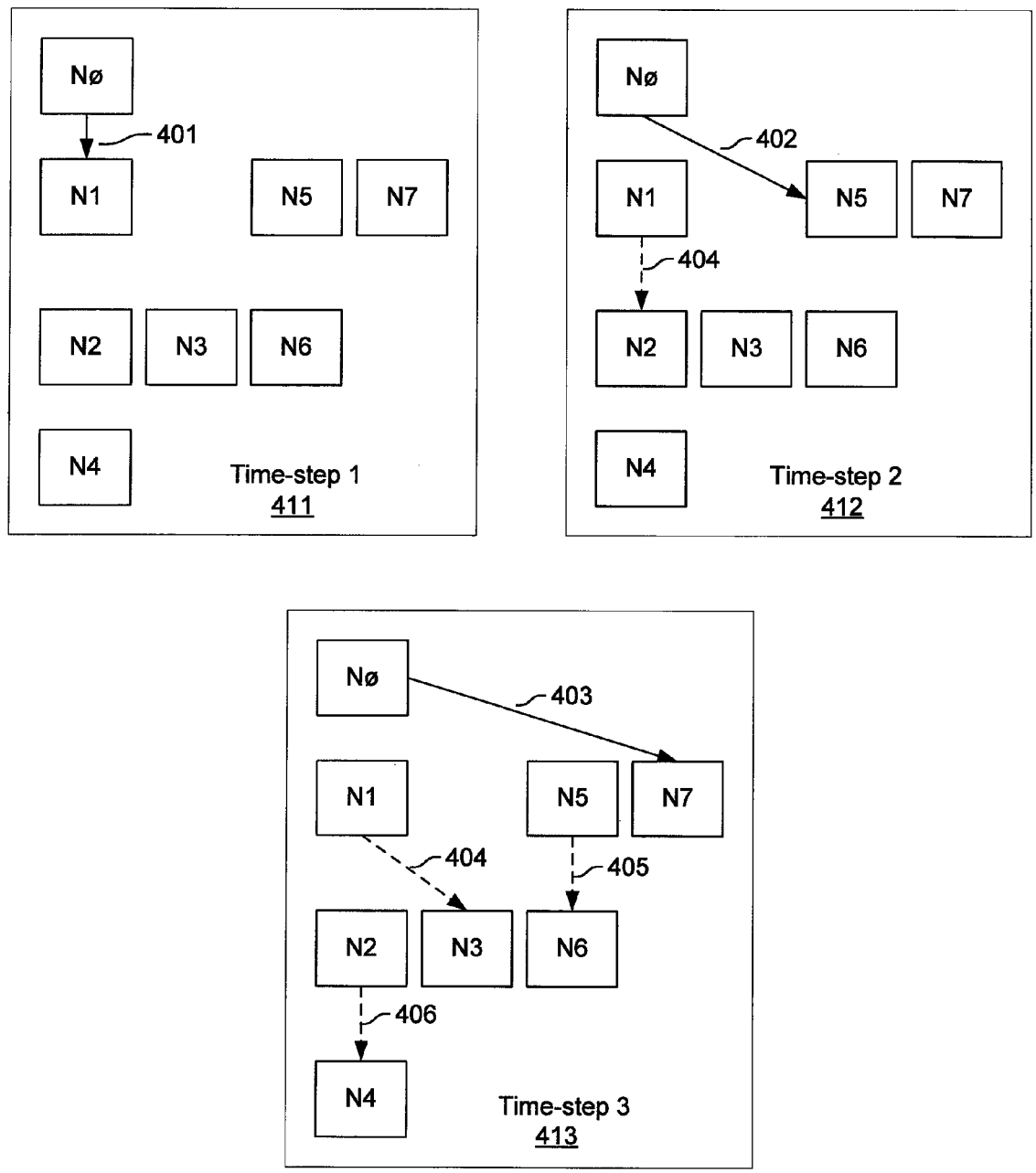
FIG. 4 is a diagram showing an exemplary multi-level single sufficient virtual channel type I Howard Cascade.

FIG. 4 is a diagram showing an exemplary multi-level single sufficient virtual channel type I Howard Cascade. In FIG. 4, a sufficient virtual channel consisting of a bandwidth limited virtual channel is indicated by a solid line, and a sufficient virtual channel comprising one or more PCIe lanes 115 is indicated by a dashed line. FIG. 4 shows 3 successive time-steps 1-3 [blocks 411-413]. A time-step signifies that one or more sufficient virtual channels are engaged in a simultaneous data transfer. The list below describes an exemplary single sufficient virtual channel 7-core Howard Cascade, shown in FIG. 4, using the hardware configuration shown in FIG. 3, with the following notational assumptions:

$Core_1$, $Processor_1$, $Hnode=N_0$
$Core_1$, $Processor_1$, $Cnode_1=N_1$
$Core_2$, $Processor_1$, $Cnode_1=N_2$
$Core_1$, $Processor_2$, $Cnode_1=N_3$
$Core_2$, $Processor_2$, $Cnode_1=N_4$
$Core_1$, $Processor_1$, $Cnode_2=N_5$
$Core_2$, $Processor_1$, $Cnode_2=N_6$
$Core_1$, $Processor_2$, $Cnode_2=N_7$
$Core_2$, $Processor_2$, $Cnode_2=N_8$ In FIG. 4, the above notational assumptions provide a simplified graphic view of Example 1 below, showing only the data movement and the cores involved.

EXAMPLE 1

Multi-Level Single Sufficient Virtual Channel Type I Howard Cascade (1) As shown in FIG. 4, in time-step 1 [block 411], node $N_0$ creates a sufficient virtual channel 401 on $port_1$ connecting Hnode 111 to Node $N_1$. Node $N_0$ also creates another sufficient virtual channel 402 on $port_2$ connecting Node $N_0$ to Node $N_5$, and finally it creates another sufficient virtual channel 403 on $port_3$ connecting Node $N_0$ to Node $N_7$.

(2) Node $N_0$ allocates a portion of its server's RAM 104 as an output message holding buffer. Nodes $N_1$ through $N_7$ allocate a portion of their respective servers' RAM 104 as an input message holding buffer.

(3) Node $N_0$ creates a message in its output message holding buffer. Node $N_1$ opens $port_1$ and awaits a message. Node $N_5$ opens $port_2$ and awaits a message. Node $N_7$ opens $port_3$ and awaits a message.

(4) Node $N_0$ opens $port_1$ to node $N_1$, between its NIC 105 and the NIC 105 of node $N_1$ through switch 114.

(5) Node $N_0$ creates a DMA connection between its allocated output message holding buffer and its NIC 105, transmitting the created message to node $N_1$, which upon receiving the message, has its DMA controller 108 store the received message in its allocated input message holding buffer.

(6) In time-step 2 [block 412], once the message has been transmitted by node $N_0$ via $port_1$, node $N_0$ closes $port_1$, then opens $port_2$ between its NIC and the NIC of node $N_5$, through switch 114. Node $N_0$ creates a DMA connection between its allocated output message holding buffer and its NIC, transmitting the created message to node $N_5$, which upon receiving the message, has its DMA controller store the received message in its allocated input message holding buffer. Node $N_1$ creates a message with its received data and performs a memory-to-memory data copy of this message into the allocated input message holding buffer of node $N_2$, using sufficient virtual channel 404.

(7) In time-step 3 [block 413], once the message has been transmitted by node $N_0$ via $port_2$, node $N_0$ closes $port_2$, then opens $port_3$ between its NIC and the NIC of node $N_7$ through switch 114. Node $N_0$ creates a DMA connection between its allocated output message holding buffer and its NIC, transmitting the created message to node $N_7$, which upon receiving the message, has its DMA controller store the received message in its allocated input message holding buffer. Node $N_5$ creates a message with its received data and performs a memory-to-memory data copy of this message into the allocated input message holding buffer of node $N_6$, using sufficient virtual channel 405. Even though channels 404, 405, and 406 are effectively extensions of channels 401/402, they are technically different channels as they are constructed using the physical PCIe bus structure rather than using the physical Ethernet wire. Node $N_1$ creates a message with its received data and performs a memory-to-memory data copy of this message into the allocated input message holding buffer of node $N_3$, using sufficient virtual channel 404. Node $N_2$ creates a message with its received data and performs a memory-to-memory data copy of this message into the allocated input message holding buffer of node $N_4$, using sufficient virtual channel 406.

In an exemplary embodiment, data transfers via virtual channels 404-406 are conducted via PCIe bus lanes 115, as indicated by corresponding dashed lines in FIG. 4.

Figure 5:
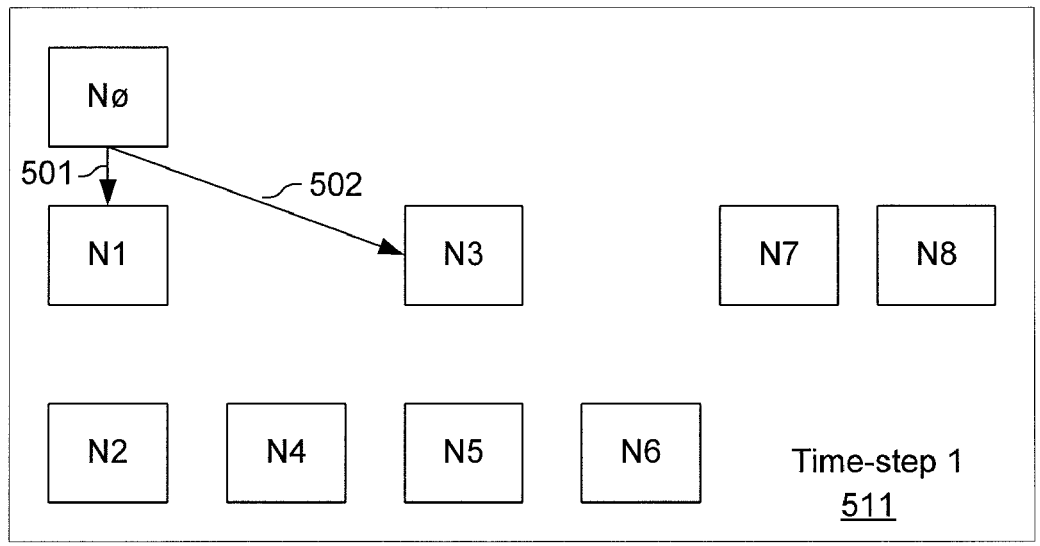
FIG. 5 is a diagram showing an exemplary multi-level duo-sufficient virtual channel type I Howard Cascade.
Figure 5:
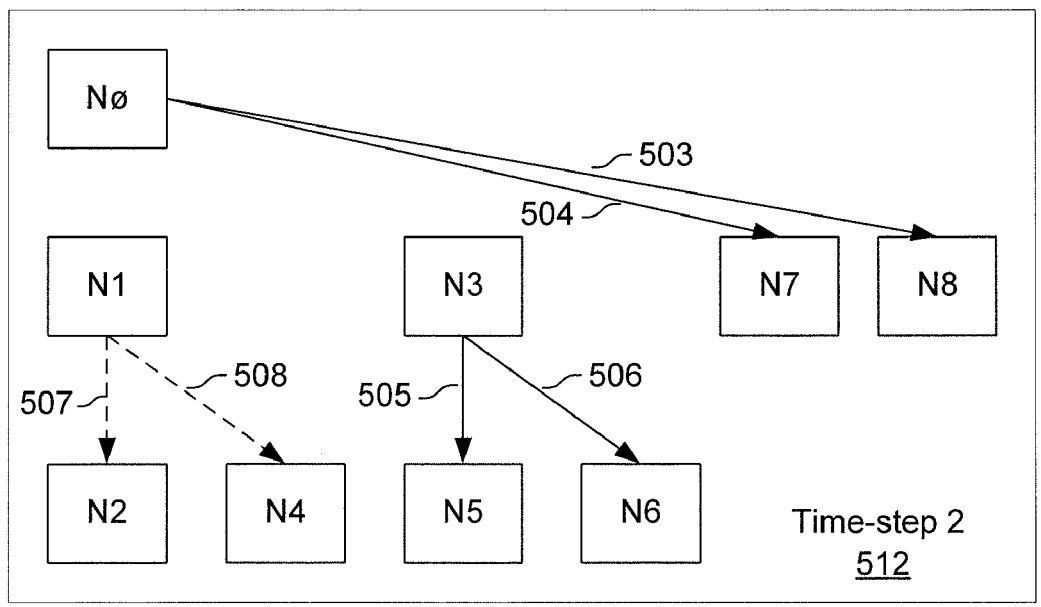

FIG. 5 is a diagram showing an exemplary multi-level dual sufficient virtual channel type I Howard Cascade, wherein each node uses two sufficient virtual channels, each one in communication with a respective node in the next Cascade level. FIG. 5 is a simplified graphic view of Example 2, below, showing only the data movement and the cores involved. In FIG. 5, a sufficient virtual channel consisting of a bandwidth limited virtual channel is indicated by a solid line, and a sufficient virtual channel consisting of one or more PCIe lanes 115 is indicated by a dashed line.

EXAMPLE 2

Multi-Level Duo-Sufficient Virtual Channel Type I Howard Cascade (1) As shown in FIG. 5, in time-step 1 [block 511], node $N_0$ creates sufficient virtual channels 501 on $port_1$ and 502 on $port_2$ connecting Hnode 111 to nodes $N_1$ and $N_3$, respectively, and also creates sufficient virtual channels 503 on $port_3$ and 504 on $port_4$ connecting node $N_0$ to nodes $N_7$ and Ng. Node $N_2$ creates sufficient virtual channels 505 on $port_5$ and 506 on $port_6$ connecting node $N_2$ to nodes $N_5$ and $N_7$.

(2) Node $N_0$ allocates a portion of its server's RAM as an output message holding buffer. Nodes $N_1$ through Ng each allocates a portion of their server's RAM as an input message holding buffer. Node $N_3$ allocates a portion of its server's RAM as an output message holding buffer.

(3) Node $N_0$ creates a message in its output message holding buffer. Node $N_1$ opens $port_1$ and awaits a message. Node $N_3$ opens $port_2$ and awaits a message. Node $N_7$ opens $port_3$ and awaits a message. Node Ng opens $port_4$ and awaits a message.

(4) Node $N_0$ opens $port_1$ and $port_2$ between its NIC and the NIC of nodes $N_1$ and $N_3$ through switch 114.

(5) Node $N_0$ creates a DMA connection between its allocated output message holding buffer and its NIC, transmitting the created message to nodes $N_1$ and $N_3$, using sufficient virtual channels 501 and 502, which upon receiving the messages, have their DMA controllers store the received messages in their allocated input message holding buffers.

(6) In time-step 2 [block 512], once the messages have been transmitted by node $N_0$ via $port_1$ and $port_2$, then node $N_0$ closes $port_1$ and $port_2$, and then opens $port_3$ and $port_4$ between its NIC and the NIC of nodes $N_7$ and Ng through switch 114. Node $N_1$ creates a message with its received data and performs a memory-to-memory data copy of this message into the allocated input message holding buffers of both nodes $N_2$ and $N_4$, using sufficient virtual channels 507 and 508, respectively. Node $N_3$ opens $port_5$ and $port_6$, creates a message into its allocated output message holding buffer with its received data and performs a DMA transfer between its allocated output message holding buffer and its NIC, transmitting the created message, via virtual channels 505/506, to nodes $N_6$ and $N_6$, respectively, which upon receiving the messages, have their DMA controllers store the received message in their allocated input message holding buffers.

(7) Node $N_0$ creates a DMA connection between its allocated output message holding buffer and its NIC, transmitting the created message to nodes $N_7$ and $N_8$, which upon receiving the messages, have their DMA controllers store the received messages in their allocated input message holding buffer.

(8) Once the message has been transmitted by node $N_0$ via $port_3$ and $port_4$, node $N_0$ closes $port_3$ and $port_4$. Once the message has been transmitted by node $N_3$ via $port_5$ and $port_6$, it then closes $port_5$ and $port_6$.

In an exemplary embodiment, data transfers via virtual channels 507 and 508 are conducted via PCIe bus lanes 115, as indicated by corresponding dashed lines in FIG. 5.

Figure 6:
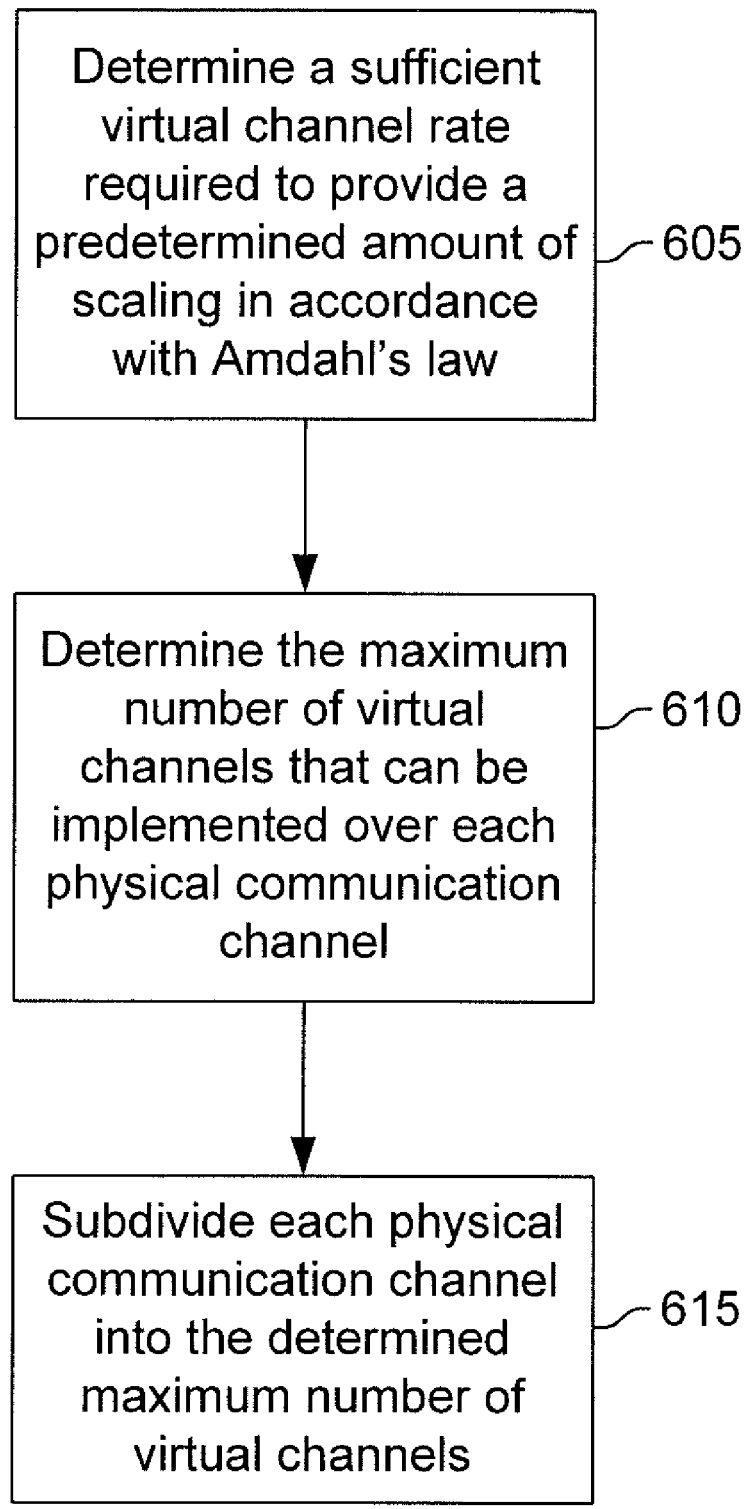
FIG. 6 is a diagram showing exemplary steps performed in interconnecting multiple computational devices in a parallel computing network.

FIG. 6 is a diagram showing exemplary steps performed in interconnecting multiple computational devices in a parallel computing network including a plurality of serially associated pairs of nodes, wherein each of the nodes is interconnected via at least one physical communication channel. As shown in FIG. 6, at step 605, a sufficient virtual channel rate required to provide a predetermined amount of Amdahl scaling is determined in accordance with Amdahl's law. At step 610, the physical communication channel rate (the average physical channel rate) is divided by the sufficient virtual channel rate to determine the maximum whole number of virtual channels that can be implemented over each physical communication channel, with each virtual channel having a transmission rate at least equal to the sufficient virtual channel rate. At step 615, the physical communication channel between each of the nodes is subdivided into the determined maximum number of virtual channels.

Certain changes may be made in the above methods and systems without departing from the scope of that which is described herein. It is to be noted that all matter contained in the above description or shown in the accompanying drawings is to be interpreted as illustrative and not in a limiting sense. The elements and steps shown in the present drawings may be modified in accordance with the methods described herein, without departing from the spirit of the system thus described. The following claims are intended to cover all generic and specific features described herein, as well as all statements of the scope of the present method, system and structure, which, as a matter of language, might be said to fall therebetween.

What is claimed is:
1. A method for interconnecting multiple computational devices in a parallel computing network including a plurality of serially associated pairs of computational nodes, wherein each of the pairs of nodes is interconnected via at least one physical communication channel, the method comprising:
  determining, in accordance with Amdahl's law, an acceptable amount of serialism for a predetermined level of parallel speedup for an algorithm executed on a pair of said nodes;
  determining a channel rate required to generate the acceptable amount of serialism;
  using the ratio of the determined channel speed and a predetermined required maximum serialism to calculate a sufficient virtual channel rate required to provide a predetermined amount of Amdahl scaling which is sufficient at a predetermined channel speed and a predetermined latency;
  determining a maximum number of virtual channels, each having a transmission rate at least equal to the sufficient virtual channel rate, that can be implemented over each physical communication channel; and
  subdividing the bandwidth of each of the physical communication channels into the determined maximum number of virtual channels, each of which is used to interconnect an associated pair of the computational devices.

2. The method of claim 1, wherein each said physical channel is subdivided into multiple discrete virtual channels with two or more of the virtual channels combined until the sufficient virtual channel rate is attained.

3. The method of claim 1, wherein the number of virtual channels implemented over each physical communication channel is dynamically changed to provide the determined sufficient virtual channel rate to optimize the number of virtual channels that can be used with a particular algorithm.

4. The method of claim 1, including subdividing the physical channel into as many virtual channels as remain sufficient to scale at a pair-wise node level, to thereby allow an increase in the number of computational elements that are in communication while maintaining the scaling of a group of computational elements processing a single problem in parallel.

5. A parallel computing network comprising:
a plurality of serially associated pairs of computational nodes, each of the nodes including at least one processor having at least one core, wherein each pair of the nodes is interconnected via a physical communication channel;
wherein each core in each computational node is interconnected with each other core therein via a bus coupled to processor memory;
wherein the bandwidth of the physical communication channel between each of the nodes is subdivided into a plurality of sufficient virtual channels;
wherein, in accordance with Amdahl's law, an acceptable amount of serialism for a predetermined level of parallel speedup for an algorithm executed on a pair of said nodes is determined, a channel rate required to generate the acceptable amount of serialism is determined, and the ratio of the determined channel speed and a predetermined required maximum serialism is used to calculate a sufficient virtual channel rate, for each of the sufficient virtual channels, required to provide a predetermined amount of Amdahl scaling which is sufficient at a predetermined said channel rate and a predetermined latency.

6. The method of claim 5, wherein at least one of the sufficient virtual channels is created between one of the cores in one node and one of the cores in another node.

7. The method of claim 5, wherein the bus comprises a plurality of PCIe bus lanes, and the sufficient virtual channel is created by using a number of the PCIe bus lanes whose aggregate rate is at least equal to the sufficient virtual channel rate.

8. The method of claim 7, wherein a portion of the associated nodes are interconnected via a bandwidth limited sufficient virtual channel, and a portion of the associated nodes are interconnected via a sufficient virtual channel consisting of one or more of the PCIe bus lanes.

9. A parallel computing network comprising:
a Howard Cascade including a physical communication channel connecting each of the nodes in the Cascade, wherein each node therein is coupled to an associated node via a single sufficient virtual channel;
wherein, in accordance with Amdahl's law, an acceptable amount of serialism for a predetermined level of parallel speedup for an algorithm executed on a pair of said nodes is determined, a channel rate required to generate the acceptable amount of serialism is determined, and the ratio of the determined channel speed and a predetermined required maximum serialism is used to calculate a sufficient virtual channel rate, for each said single sufficient virtual channel, required to provide a predetermined amount of Amdahl scaling which is sufficient at a predetermined said channel rate and a predetermined latency;
wherein the bandwidth of the physical communication channel between each of the nodes is subdivided into a plurality of said sufficient virtual channels, each of which is used to interconnect an associated pair of the nodes.

10. The method of claim 9, wherein a portion of the associated nodes are interconnected via a bandwidth limited sufficient virtual channel, and a portion of the associated nodes are interconnected via a sufficient virtual channel consisting of one or more PCIe bus lanes.

11. A parallel computing network including a plurality of pair-wise associated nodes comprising:
a Howard Cascade including a physical communication channel between each of the nodes in the Cascade,
wherein each of the nodes in a given level of the Cascade communicates with each of two associated nodes in a successive level of the Cascade via one of two respective sufficient virtual channels;
wherein, in accordance with Amdahl's law, an acceptable amount of serialism for a predetermined level of parallel speedup for an algorithm executed on a pair of said nodes is determined, a channel rate required to generate the acceptable amount of serialism is determined, and the ratio of the determined channel speed and a predetermined required maximum serialism is used to calculate a sufficient virtual channel rate, for each of the sufficient virtual channels required to provide a predetermined amount of Amdahl scaling which is sufficient at a predetermined said channel rate and a predetermined latency.

12. The method of claim 11, wherein a portion of the associated nodes are interconnected via a bandwidth limited sufficient virtual channel, and a portion of the associated nodes are interconnected via a sufficient virtual channel consisting of one or more PCIe bus lanes.

13. A method for determining a minimum number of serially associated pairs of nodes required to provide a predetermined amount of Amdahl scaling in a network including a plurality of said nodes and at least an equal number of computational elements, wherein each of the nodes is interconnected via at least one physical communication channel, the method comprising:
determining, in accordance with Amdahl's law, a sufficient communication channel rate required to provide the predetermined amount of Amdahl scaling; and
calculating a required minimum number of said nodes based on the determined sufficient communication channel rate and the average bandwidth of each said communication channel;
wherein, in accordance with Amdahl's law, an acceptable amount of serialism for a predetermined level of parallel speedup for an algorithm executed on a pair of said nodes is determined, a channel rate required to generate the acceptable amount of serialism is determined, and the ratio of the determined channel speed and a predetermined required maximum serialism is used to calculate the sufficient communication channel rate, for each of the sufficient virtual channels, required to provide a predetermined amount of Amdahl scaling which is sufficient at a predetermined said channel rate and a predetermined latency.

14. The method of claim 13, wherein each of the serially associated pairs of nodes is interconnected via at least one virtual communication channel, which is a subdivision of the physical communication channel.

15. The method of claim 13, wherein the maximum number of the pairs required to effect the predetermined amount of Amdahl scaling for any number of associated nodes is equal to the number of pairs in the longest path of serially associated pairs of the nodes in the network.

* * * * *